United States Patent
Ooki

(10) Patent No.: US 11,428,318 B2
(45) Date of Patent: Aug. 30, 2022

(54) POWER TRANSMISSION DEVICE

(71) Applicant: JATCO LTD, Fuij (JP)

(72) Inventor: Shinjiro Ooki, Kanagawa (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 17/429,308

(22) PCT Filed: Dec. 3, 2019

(86) PCT No.: PCT/JP2019/047107
§ 371 (c)(1),
(2) Date: Aug. 6, 2021

(87) PCT Pub. No.: WO2020/183816
PCT Pub. Date: Sep. 17, 2020

(65) Prior Publication Data
US 2022/0107020 A1    Apr. 7, 2022

(30) Foreign Application Priority Data
Mar. 10, 2019 (JP) .............................. JP2019-043246

(51) Int. Cl.
*F16H 63/34* (2006.01)
*F16H 1/46* (2006.01)
*F16H 37/06* (2006.01)
*F16H 57/021* (2012.01)
*F16H 57/02* (2012.01)

(52) U.S. Cl.
CPC ........... *F16H 63/3425* (2013.01); *F16H 1/46* (2013.01); *F16H 37/065* (2013.01); *F16H 57/021* (2013.01); *F16H 2057/02034* (2013.01); *F16H 2057/02043* (2013.01)

(58) Field of Classification Search
CPC ...... F16H 63/3425; F16H 1/46; F16H 37/065; F16H 57/021; F16H 2057/02034; F16H 2057/02043
See application file for complete search history.

(56) References Cited

U.S. PATENT DOCUMENTS

| 3,327,565 | A | * | 6/1967 | Grattan | ............... F16H 61/0293 192/221 |
| 5,295,412 | A | | 3/1994 | Donato et al. | |
| 5,389,047 | A | | 2/1995 | Akiyama | |
| 5,397,282 | A | | 3/1995 | Weidman | |
| 7,496,435 | B2 | * | 2/2009 | Iwatsuki | ............... B60K 6/445 477/3 |

(Continued)

FOREIGN PATENT DOCUMENTS

| JP | H01-067360 U | 4/1989 |
| JP | 2011-027245 A | 2/2011 |

(Continued)

*Primary Examiner* — Tinh Dang
(74) *Attorney, Agent, or Firm* — Global IP Counselors, LLP

(57) ABSTRACT

A power transmission device includes a planetary gear, a reduction gear connected downstream of the planetary gear, a parking lock mechanism including a parking pawl configured to lock one rotation element of the planetary gear, and a barrier wall positioned between the planetary gear and the reduction gear. The parking pawl is rotatably supported on the barrier wall.

11 Claims, 7 Drawing Sheets

(56) References Cited

U.S. PATENT DOCUMENTS

| | | | | |
|---|---|---|---|---|
| 7,845,472 B2* | 12/2010 | Gil | ............... | B60T 11/046 |
| | | | | 188/72.8 |
| 8,684,880 B2* | 4/2014 | Kato | ............... | F16H 57/0006 |
| | | | | 192/219.5 |
| 2007/0151816 A1* | 7/2007 | Gil | ............... | B60T 13/746 |
| | | | | 188/2 D |
| 2011/0207570 A1 | 8/2011 | Tanaka et al. | | |
| 2015/0126322 A1 | 5/2015 | Biermann et al. | | |
| 2016/0265630 A1 | 9/2016 | Iwase et al. | | |
| 2017/0299055 A1* | 10/2017 | Tomita | ............... | F16H 63/3416 |
| 2018/0180162 A1 | 6/2018 | Hakuta et al. | | |
| 2018/0363755 A1 | 12/2018 | Wakui | | |
| 2019/0154149 A1 | 5/2019 | Gruber et al. | | |

FOREIGN PATENT DOCUMENTS

| | | |
|---|---|---|
| JP | 2011-102639 A | 5/2011 |
| JP | 2018-103676 A | 7/2018 |
| WO | 2019/039599 A1 | 5/2002 |
| WO | 2015/080267 A1 | 6/2015 |
| WO | 2018/001476 A1 | 1/2018 |

* cited by examiner

POWER TRANSMISSION DEVICE

CROSS-REFERENCE TO RELATED APPLICATIONS

This is a U.S. national phase application of PCT/JP2019/047107, filed on Dec. 3, 2019, which claims priority to Japanese Patent Application No. 2019-043246, filed on Mar. 10, 2019. The entire disclosure of Japanese Patent Application No. 2019-043246 is hereby incorporated herein by reference.

TECHNICAL FIELD

The present invention relates to a power transmission device.

BACKGROUND ART

In Japanese Laid-Open Patent Publication No. 2018-103676, disclosed is a power transmission device for an electric vehicle.

SUMMARY

It is preferable for the torque input from the output side (drive wheel side) to a parking lock mechanism to be as small as possible when a vehicle is stopped.

One embodiment of the present invention is a power transmission device configured having: a planetary gear, a reduction gear connected downstream of the planetary gear, and a parking lock mechanism, wherein the parking lock mechanism locks one rotation element of the planetary gear.

According to the present invention, it is possible to make the torque input from the output side (drive wheel side) to the parking lock mechanism small when a vehicle is stopped.

DETAILED DESCRIPTION OF EMBODIMENTS

Following, embodiments of the present invention are explained.

Figure 1:
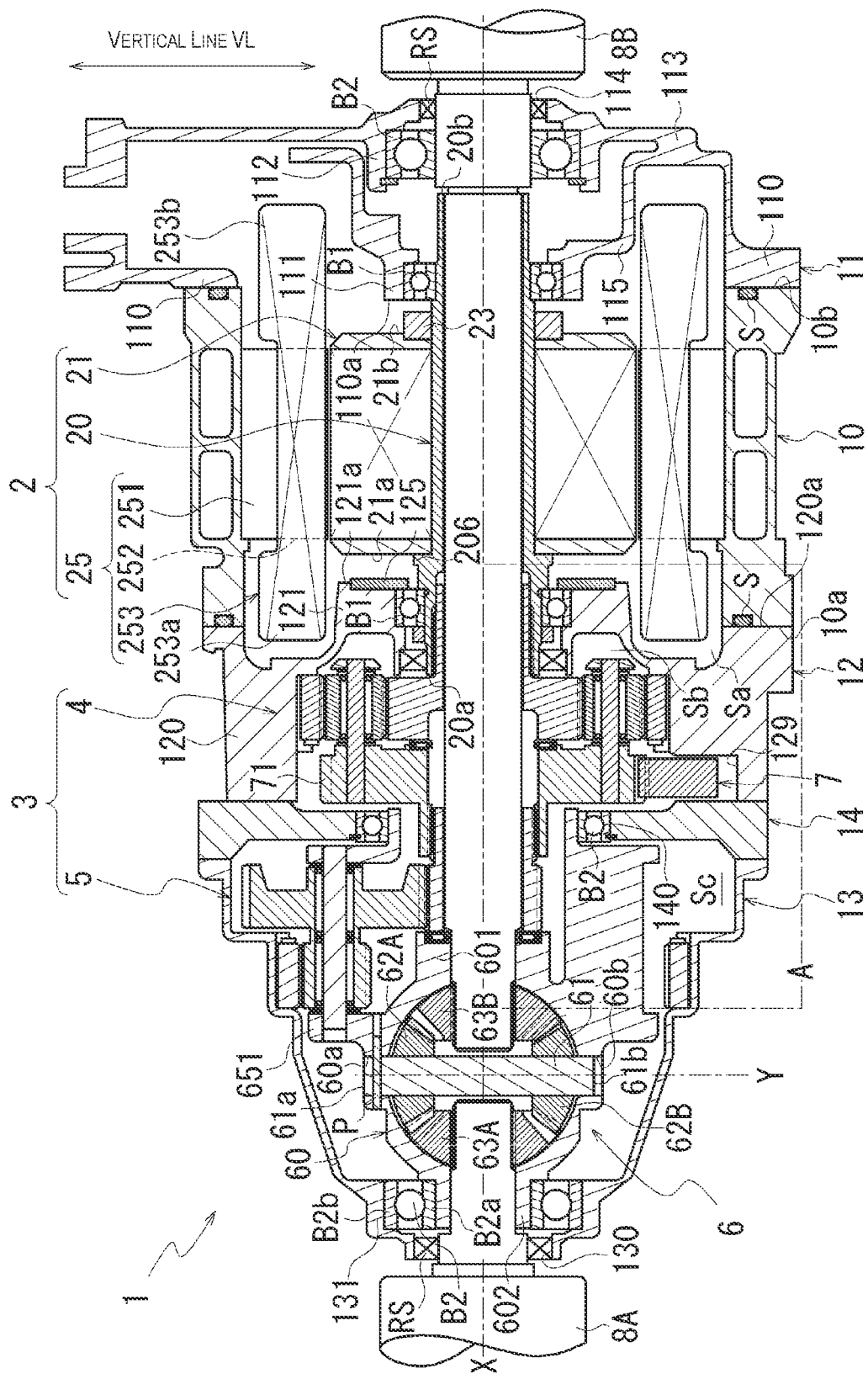
FIG. 1 is a drawing for explaining a power transmission device of the present embodiment.

FIG. 1 is a drawing for explaining a power transmission device 1 of the present embodiment.

Figure 2:
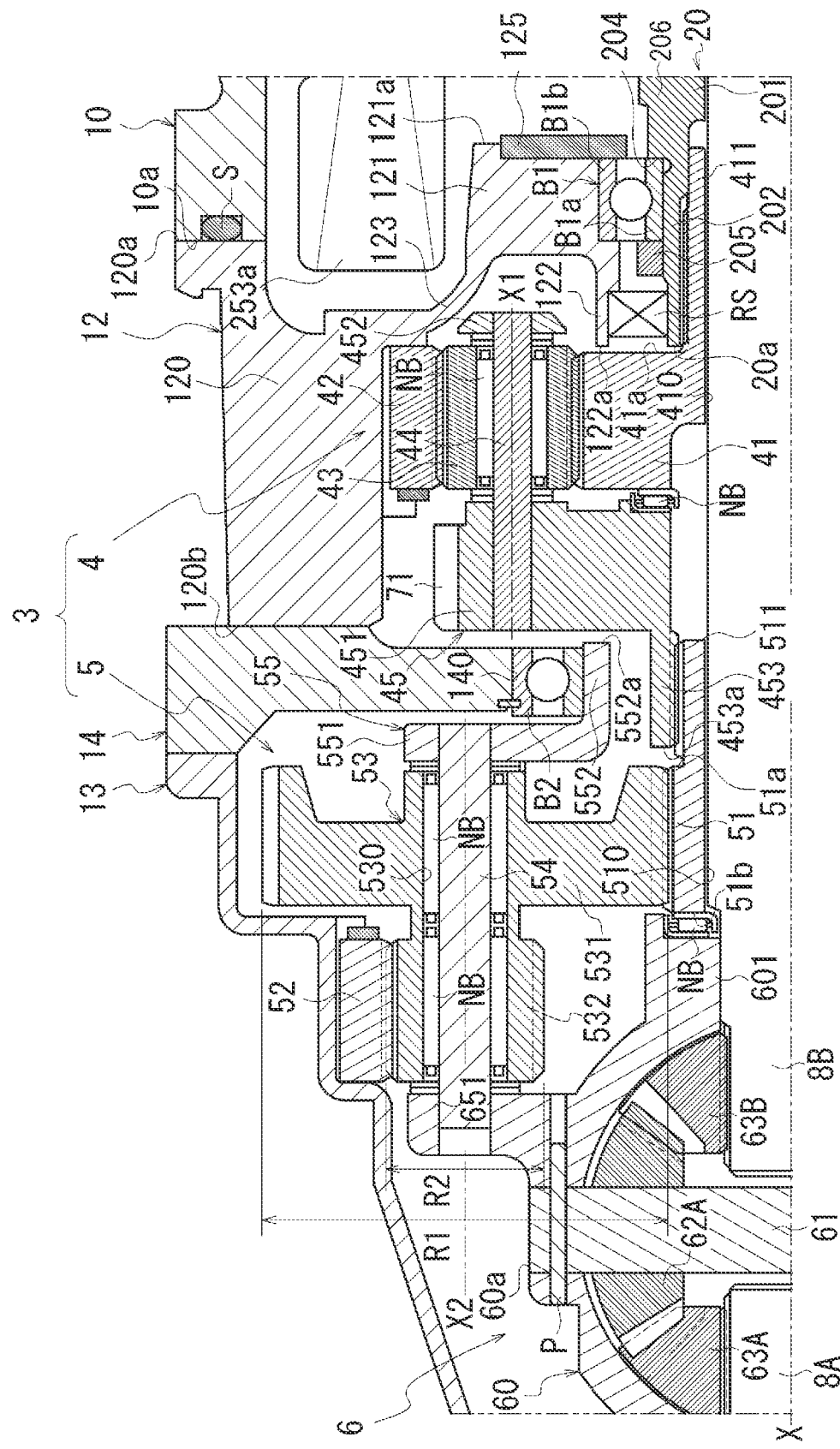
FIG. 2 is a drawing for explaining the power transmission device of the present embodiment.

FIG. 2 is a drawing for explaining the power transmission device 1 of the present embodiment, and is an enlarged view around a reduction mechanism 3 (first planetary reduction gear 4, second planetary reduction gear 5) of the power transmission device 1.

Figure 3:
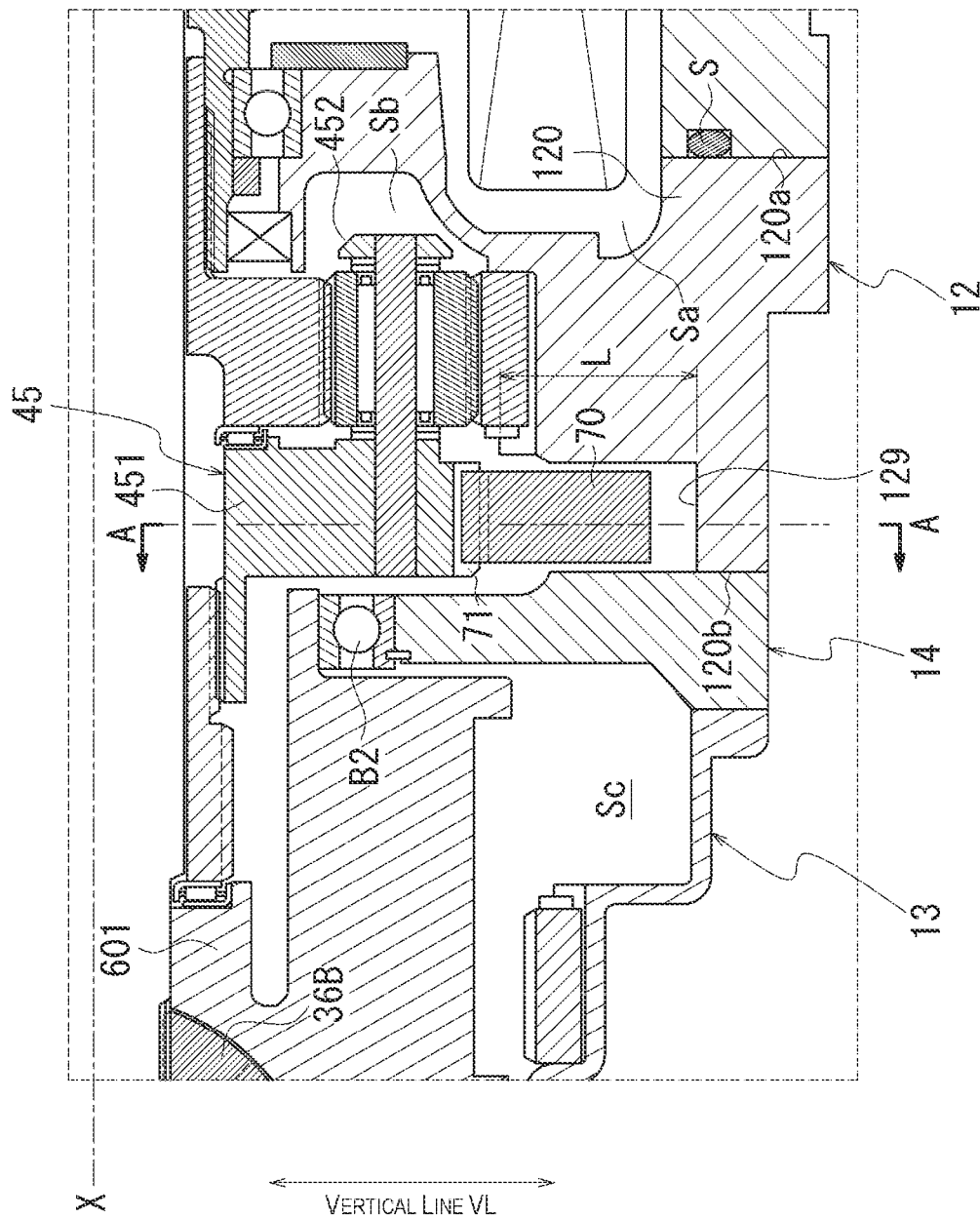
FIG. 3 is a drawing for explaining the power transmission device of the present embodiment.

FIG. 3 is a drawing for explaining the power transmission device 1 of the present embodiment, and is an enlarged view of region A in FIG. 1.

Figure 4:
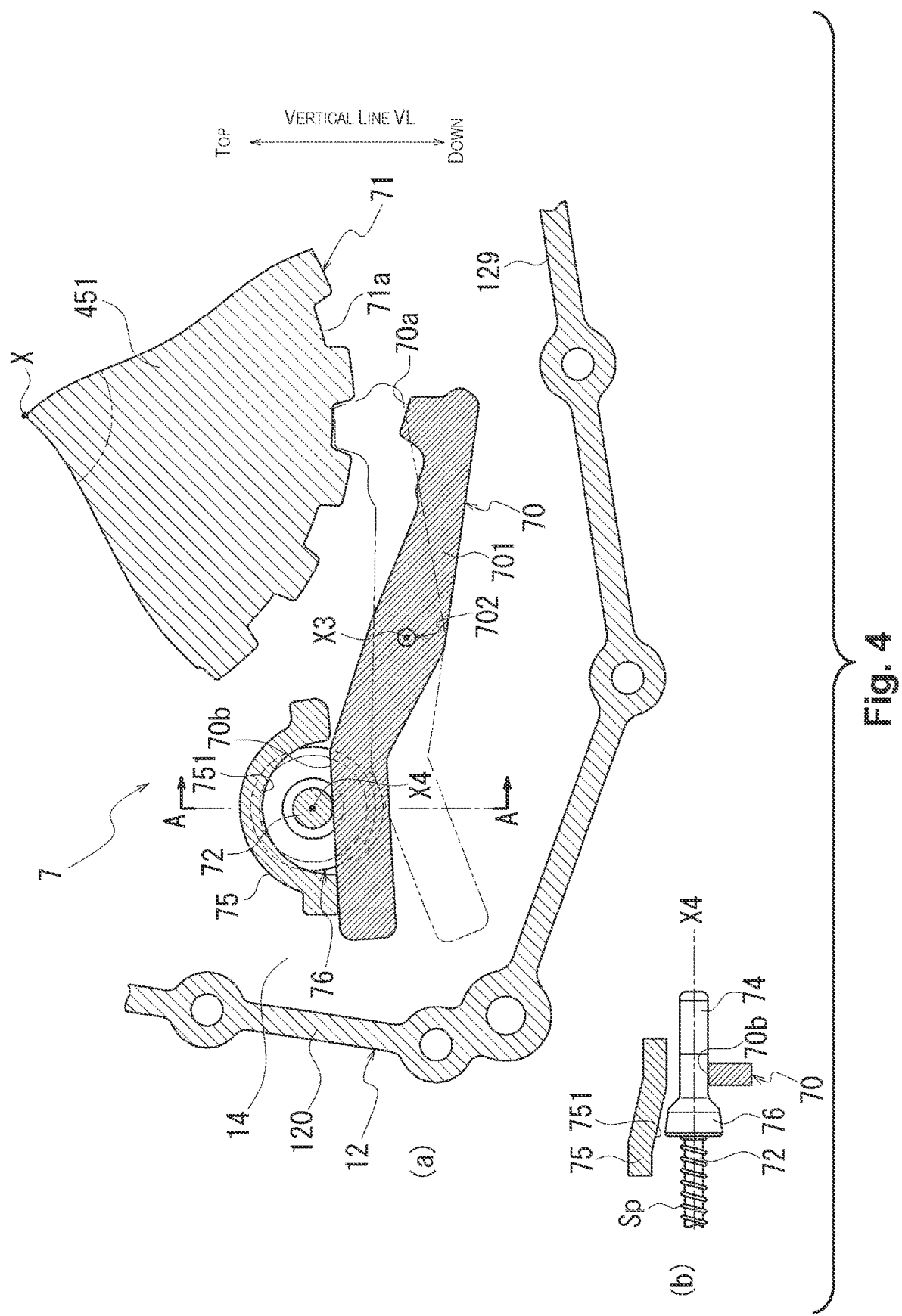
FIG. 4 is a drawing for explaining a parking lock mechanism.

FIG. 4 is a drawing for explaining a parking lock mechanism 7, and is a drawing schematically showing the A-A cross section in FIG. 3.

The power transmission device 1 has: a motor 2; the reduction mechanism 3 (first planetary reduction gear 4, second planetary reduction gear 5) that reduces output rotation of the motor 2 and inputs that to the differential device 6; and drive shafts 8 (8A, 8B).

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

The output rotation of the motor 2 is reduced by the reduction mechanism 3, and after being inputted to the differential device 6, is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the first planetary reduction gear 4 is connected downstream of the motor 2, and the second planetary reduction gear 5 is connected downstream of the first planetary reduction gear 4. The differential device 6 is connected downstream of the second planetary reduction gear 5, and the drive shafts 8A, 8B are connected downstream of the differential device 6.

The motor 2 has: a cylindrical motor shaft 20; a cylindrical rotor core 21 externally fitted on the motor shaft 20; and a stator core 25 that surrounds the outer circumference of the rotor core 21 with a prescribed gap.

The motor shaft 20 is provided to be able to rotate relatively with respect to the drive shaft 8B in a state externally fitted on the drive shaft 8B.

With the motor shaft 20, bearings B1, B1 are externally fitted and fixed to the outer circumference of one end 20a side and another end 20b side in the longitudinal direction.

The one end 20a side of the motor shaft 20 is supported to be able to rotate by a cylindrical motor support unit 121 of an intermediate case 12 with the bearing B1 interposed.

The other end 20b side of the motor shaft 20 is supported to be able to rotate by a cylindrical motor support unit 111 of a cover 11 with the bearing B1 interposed.

The motor 2 has a motor housing 10 that surrounds the outer circumference of the rotor core 21 with a prescribed gap. With the present embodiment, the intermediate case 12 is joined to one end 10a of the motor housing 10, and the cover 11 is joined to the other end 10b of the motor housing 10.

Seal rings S, S are provided on the one end 10a and the other end 10b of the motor housing 10. The one end 10a of the motor housing 10 is joined without a gap to a cylindrical base 120 of the intermediate case 12 by the seal ring S provided on that one end 10a.

The other end 10b of the motor housing 10 is joined without a gap to a ring-shaped junction part 110 of the cover 11 by the seal ring S provided on that other end 10b.

With the intermediate case 12, the motor support unit 121 is provided at one end 120a side of the base 120 in the rotation axis X direction.

With the present embodiment, when the one end 120a of the base 120 is fixed to the one end 10a of the motor housing 10, the motor support unit 121 is made to be inserted inside the motor housing 10.

In this state, the motor support unit 121 is arranged facing one end part 21a of the rotor core 21 with a gap open in the rotation axis X direction at the inner diameter side of a coil end 253a described later (see FIG. 2).

Also, a connecting part 123 that connects the base 120 and the motor support unit 121 is provided avoiding contact with the coil end 253a and a side plate 452 described later.

A bearing retainer 125 is fixed to an end surface 121a of the rotor core 21 side of the motor support unit 121.

The bearing retainer 125 has a ring shape when seen from the rotation axis X direction. The inner diameter side of the bearing retainer 125 abuts the side surface of an outer race B1b of the bearing B1 supported by the motor support unit 121 from the rotation axis X direction. The bearing retainer 125 prevents falling off of the bearing B1 from the motor support unit 121.

With the cover 11, the junction part 110 and the motor support unit 111 are provided with the positions displaced in the rotation axis X direction.

With the present embodiment, when the junction part 110 of the cover 11 is fixed to the other end 10b of the motor housing 10, the motor support unit 111 is made to be inserted inside the motor housing 10.

In this state, the motor support unit 111 is arranged facing an other end part 21b of the rotor core 21 with a gap open in the rotation axis X direction at the inner diameter side of a coil end 253b described later.

A connecting part 115 that connects the junction part 110 and a side wall part 113 of the cover 11 is provided while avoiding contact with the coil end 253b and a support cylinder 112 described later.

Inside the motor housing 10, the rotor core 21 is arranged between the motor support unit 111 of the cover 11 side, and the motor support unit 121 of the intermediate case 12 side.

The rotor core 21 is formed by laminating a plurality of silicon steel sheets, and each of the silicon steel sheets is externally fitted on the motor shaft 20 in a state where relative rotation with the motor shaft 20 is regulated.

Viewed from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 206 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted, and the stator core 25 has a longer length in the rotation axis X direction than the rotor core 21 by the amount of the coil ends 253a, 253b projecting in the rotation axis X direction.

It is also possible to adopt the stator core of a configuration in which the winding 253 is concentrically wound on each of the plurality of teeth parts 252 projecting to the rotor core 21 side.

With the motor shaft 20, the bearing B1 is press-fitted further to the outer circumference of the area of the one end 20a side than the large diameter part 206.

As shown in FIG. 2, with an inner race B1a of the bearing B1, one side surface of the rotation axis X direction abuts a step part 204 provided on the outer circumference of the motor shaft 20. With the inner race B1a, a ring-shaped stopper 205 that is press-fitted in the outer circumference of the motor shaft 20 abuts the other side surface.

With the bearing B1, the inner race B1a is positioned by the stopper 205 at a position abutting the step part 204.

The one end 20a of the motor shaft 20 is positioned more to the differential device 6 side (left side in the drawing) than the stopper 205. In the rotation axis X direction, the one end 20a faces a side surface 41a of a sun gear 41 of the first planetary reduction gear 4 with a gap open.

At the one end 20a side of the motor shaft 20, a cylinder wall 122 is positioned radially outward of the motor shaft 20.

The cylinder wall 122 projects to the differential device 6 side from the motor support unit 121, and a tip 122a of the cylinder wall 122 faces the side surface 41a of the sun gear 41 of the first planetary reduction gear 4 with a gap open.

The cylinder wall 122 surrounds the outer circumference of the motor shaft 20 with a prescribed gap, and a lip seal RS is arranged between the cylinder wall 122 and the motor shaft 20.

The lip seal RS is provided to partition a space Sa (see FIG. 1) of the inner diameter side of the motor housing 10 and a space Sb (see FIG. 1) of the inner diameter side of the intermediate case 12.

The space Sb of the inner diameter side of the intermediate case 12 is linked with a space Sc inside a case 13 that houses the differential device 6 described later, and lubricating oil of the differential device 6 is sealed within. The lip seal RS is provided to block inflow of lubricating oil to the space Sa of the inner diameter side of the motor housing 10.

As shown in FIG. 2, an area 202 of the one end 20a side of the motor shaft 20 is formed with a larger inner diameter than an area 201 on which the rotor core 21 is externally fitted.

A cylindrical linking part 411 of the sun gear 41 is inserted inside the area 202 of this one end 20a side. In this state, the area 202 of the one end 20a side of the motor shaft 20 and the linking part 411 of the sun gear 41 are spline fitted without being able to rotate relatively.

For that reason, the output rotation of the motor 2 is inputted to the sun gear 41 of the first planetary reduction gear 4 via the motor shaft 20, and the sun gear 41 rotates around the rotation axis X by the rotational drive power of the motor 2.

The sun gear 41 has the linking part 411 extending in the rotation axis X direction from the side surface 41a of the inner diameter side. The linking part 411 is formed integrally with the sun gear 41. A through hole 410 is formed straddling the inner diameter side of the sun gear 41 and the inner diameter side of the linking part 411.

The sun gear 41 is supported to be able to rotate on the outer circumference of the drive shaft 8B penetrating the through hole 410.

A ring gear 42 of the first planetary reduction gear 4 fixed to the inner circumference of the base 120 of the intermediate case 12 is positioned at the outer diameter side of the sun gear 41 in the radial direction of the rotation axis X. In the radial direction of the rotation axis X, between the sun gear 41 and the ring gear 42, a pinion gear 43 that is supported to be able to rotate on a pinion shaft 44 is engaged with the outer circumference of the sun gear 41 and the inner circumference of the ring gear 42.

The pinion gear 43 is supported to be able to rotate at the outer circumference of the pinion gear 43 via a needle bearing NB. The pinion shaft 44 penetrates the pinion gear 43 in the axis line X1 direction along the rotation axis X. One end and the other end of the longitudinal direction of the pinion shaft 44 is supported by a pair of side plates 451, 452 of a carrier 45 of the first planetary reduction gear 4.

The side plates 451, 452 are provided in parallel with each other with a gap open in the rotation axis X direction.

Between the side plates 451, 452, the plurality of pinion gears 43 are provided in a plurality (four, for example) at a prescribed interval in the circumferential direction around the rotation axis X.

The side plate 451 has a ring shape when seen from the rotation axis X direction.

As shown in FIG. 1, the side plate 451 is surrounded by the base 120 of the intermediate case 12 along the entire circumference in the circumferential direction around the rotation axis X. The outer circumference surface of the side plate 451 faces the inner circumference surface of the base 120 in the radial direction of the rotation axis X.

At the outer circumference of the side plate 451, a parking gear 71 of the parking lock mechanism 7 described later is formed. The parking gear 71 is formed along the entire circumference of the outer circumference surface of the side plate 451 in the circumferential direction around the rotation axis X. The parking gear 71 is formed integrally with the side plate 451, and rotates around the rotation axis X integrally with the side plate 451.

A tooth groove part 71a that the parking pawl 70 described later engages and disengages with is provided in the parking gear 71 (see FIG. 4). The tooth groove part 71a is provided at a prescribed interval along the entire circumference in the circumferential direction around the rotation axis X.

As shown in FIG. 3, a recess 129 is formed at a position facing the side plate 451 in the radial direction of the rotation axis X in the base 120 of the intermediate case 12. The recess 129 is formed below the rotation axis X in the vertical line VL direction in the state with the power transmission device 1 installed. The recess 129 opens at another end 120b of the base 120 in the rotation axis X direction.

The parking lock mechanism 7 described later is housed in the recess 129. A length L of the recess 129 in the radial direction of the rotation axis X is set to be a length that does not obstruct engagement and disengagement of the parking pawl 70 in the tooth groove part 71a.

As shown in FIG. 2, a cylindrical linking part 453 is provided on the side plate 451 positioned at the differential device 6 side.

The linking part 453 in the side plate 451 is arranged concentrically with respect to the rotation axis X, and projects in the direction approaching the differential device 6 (leftward in the drawing) along the rotation axis X.

The ring shaped intermediate cover 14 is positioned at the other end 120b side of the base 120 of the intermediate case 12. The intermediate cover 14 is provided in a state sandwiched between the intermediate case 12 and the case 13.

The linking part 453 provided on the inner diameter side of the side plate 451 penetrates an opening 140 at the center of the intermediate cover 14 to the left of the differential device 6 side from the motor 2 side.

The tip 453a of the linking part 453 is positioned inside the case 13 attached to the intermediate cover 14. The tip 453a of the linking part 453 in the rotation axis X direction faces a side surface 51a of a sun gear 51 of the second planetary reduction gear 5 with a gap open.

A cylindrical linking part 511 extending from the sun gear 51 is inserted inside the linking part 453 and spline fitted, and the linking part 453 of the first planetary reduction gear 4 side and the linking part 511 of the second planetary reduction gear 5 side are linked without being able to rotate relatively.

The sun gear 51 has the linking part 511 extending in the rotation axis X direction from the side surface 51a of the inner diameter side. The linking part 511 is formed integrally with the sun gear 51, and a through hole 510 is formed straddling the inner diameter side of the sun gear 51 and the inner diameter side of the linking part 511.

The sun gear 51 is supported to be able to rotate on the outer circumference of the drive shaft 8B penetrating the through hole 510.

A side surface 51b of the differential device 6 side of the sun gear 51 faces a cylindrical support unit 601 of the differential case 60 described later with a gap open in the rotation axis X direction, and the needle bearing NB is interposed between the side surface 51b and the support unit 601.

The sun gear 51 engages with a large diameter gear part 531 of a stepped pinion gear 53 on an extension of the abovementioned linking part 542 of the first planetary reduction gear 4 side.

The stepped pinion gear 53 has the large diameter gear part 531 that engages with the sun gear 51, and a small diameter gear part 532 having a smaller diameter than the large diameter gear part 531.

The stepped pinion gear 53 is a gear component in which the large diameter gear part 531 and the small diameter gear part 532 are provided integrally, aligned in an axis line X2 direction that is parallel to the rotation axis X.

The stepped pinion gear 53 has a through hole 530 penetrating the inner diameter side of the large diameter gear part 531 and the small diameter gear part 532 in the axis line X2 direction.

The stepped pinion gear 53 is supported to be able to rotate on the outer circumference of a pinion shaft 54 penetrating the through hole 530 with the needle bearing NB interposed.

One end and the other end in the longitudinal direction of the pinion shaft 54 are supported by a side plate 651 integrally formed with the differential case 60, and a side plate 551 arranged on this side plate with a gap open.

The side plates 651, 551 are provided in parallel with each other with a gap open in the rotation axis X direction.

Between the side plates 651, 551, the plurality of stepped pinion gears 53 are provided in a plurality (three, for example) at a prescribed interval in the circumferential direction around the rotation axis X.

Each of the small diameter gear parts 532 is engaged with the inner circumference of the ring gear 52. The ring gear 52 is spline fitted with the inner circumference of the case 13, and relative rotation of the ring gear 52 with the case 13 is regulated.

At the inner diameter side of the side plate 551, a cylindrical part 552 is provided extending to the first planetary reduction gear 4 side. The cylindrical part 552 penetrates the opening 140 at the center of the intermediate cover 14 at the motor 2 side (right side in the drawing) from the differential device 6 side. A tip 552a of the cylindrical part 552 faces the side plate 451 of the carrier 45 of the first planetary reduction gear 4 in the rotation axis X direction with a gap open.

The cylindrical part 552 is positioned radially outward of the engaging part between the linking part 453 of the first planetary reduction gear 4 side, and the linking part 511 of the second planetary reduction gear 5 side. A bearing B2 fixed to the inner circumference of the opening 140 of the intermediate cover 14 is in contact with the outer circumference of the cylindrical part 552. The cylindrical part 552 of the side plate 551 is supported to be able to rotate on the intermediate cover 14 with the bearing B2 interposed.

With the second planetary reduction gear 5, one side plate 651 of the side plate 551 and the side plate 651 constituting the carrier 55 is formed integrally with the differential case 60 of the differential device 6.

With the second planetary reduction gear 5, the output rotation of the motor 2 reduced by the first planetary reduction gear 4 is inputted to the sun gear 51.

The output rotation inputted to the sun gear 51 is inputted to the stepped pinion gears 53 via the large diameter gear part 531 that engages with the sun gear 51, and the stepped pinion gear 53 rotates around the axis line X2.

Having done that, the small diameter gear part 532 that is integrally formed with the large diameter gear part 531 rotates around the axis line X2 integrally with the large diameter gear part 531.

Here, the small diameter gear part 532 engages with the ring gear 52 fixed to the inner circumference of the case 13. For that reason, when the small diameter gear part 532 rotates around the axis line X2, the stepped pinion gear 53 rotates around the rotation axis X while auto-rotating around the axis line X2.

Having done that, the one end of the pinion shaft 54 is supported on the side plate 651 that is integrally formed with the differential case 60, so in conjunction with the displacement of the stepped pinion gear 53 in the circumferential direction around the rotation axis X, the differential case 60 rotates around the rotation axis X.

Here, with the stepped pinion gear 53, an outer diameter R2 of the small diameter gear part 532 is smaller than an outer diameter R1 of the large diameter gear part 531 (see FIG. 2).

Also, with the second planetary reduction gear 5, the sun gear 51 serves as the input unit of the output rotation of the motor, and the carrier 55 that supports the stepped pinion gear 53 serves as the output unit of the inputted rotation.

Having done that, the rotation inputted to the sun gear 51 of the second planetary reduction gear 5, after being significantly reduced by the stepped pinion gear 53, is outputted to the differential case 60 with which the side plate 651 of the carrier 55 is integrally formed.

As shown in FIG. 1, the differential case 60 is formed to have a hollow shape that internally houses a shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

An inner race B2a of the bearing B2 is press fitted on the outer circumference of a support unit 602. An outer race B2b of the bearing B2 is held by a ring-shaped support unit 131 of the case 13, and the support unit 602 of the differential case 60 is supported to be able to rotate by the case 13 with the bearing B2 interposed.

The drive shaft 8A that penetrates an opening 130 of the case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The drive shaft 8B that penetrates an opening 114 of the cover 11 is inserted in the support unit 601 from the rotation axis X direction.

The drive shaft 8B is provided crossing the motor shaft 20 of the motor 2, the sun gear 41 of the first planetary reduction gear 4, and the inner diameter side of the sun gear 51 of the second planetary reduction gear 5 in the rotation axis X direction, and the tip end side of the drive shaft 8B is supported to be able to rotate by the support unit 601.

The lip seal RS is fixed to the inner circumference of the opening 114 of the cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

In the interior of the differential case 60, side gears 63A, 63B are spline fitted at the outer circumference of the tip end part of the drive shafts 8A, 8B, and the side gears 63A, 63B and drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and one end 61a side and another end 61b side of the shaft 61 are inserted.

The one end 61a side and the other end 61b side of the shaft 61 are fixed to the differential case 60 by a pin P, and the shaft 61 is prohibited from auto-rotating around the axis line Y.

The bottom side of the differential case 60 is immersed in the lubricating oil inside the case 13.

With the present embodiment, when the one end 61a or the other end 61b of the shaft 61 is positioned at the bottommost side, the lubricating oil is pooled inside the case 13 at least to a height at which the one end 61a or the other end 61b of the shaft 61 is positioned within the lubricating oil.

The shaft 61 is arranged along the axis line Y positioned between the side gears 63A, 63B inside the differential case 60.

The bevel gears 62A, 62B are externally fitted on the shaft 61 inside the differential case 60 and supported to be able to rotate.

Two bevel gears 62A, 62B are provided with a gap opened in the longitudinal direction of the shaft 61 (axial direction of the axis line Y), and the bevel gears 62A, 62B are arranged in a state so that their teeth face each other. In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the rotation axis X direction.

Two side gears 63A, 63B are provided with a gap open in the rotation axis X direction in a state so that their teeth face each other, and the bevel gears 62A, 62B and the side gears 63A, 63B are assembled in a state with the teeth mutually engaged.

The action of the power transmission device 1 of this configuration is explained.

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

When the rotor core 21 rotates around the rotation axis X by the driving of the motor 2, the rotation is inputted to the sun gear 41 of the first planetary reduction gear 4 via the motor shaft 20 that rotates integrally with the rotor core 21.

With the first planetary reduction gear 4, the sun gear 41 serves as the input unit of the output rotation of the motor 2, and the carrier 45 that supports the pinion gear 43 serves as the output unit of the inputted rotation.

When the sun gear 41 rotates around the rotation axis X by the output rotation of the motor 2, the pinion gear 43 engaged with the outer circumference of the sun gear 41 and the inner circumference of the ring gear 42 rotates around the axis line X1.

Here, the ring gear 42 is spline fitted to the inner circumference of the intermediate case 12 (fixed side member), and relative rotation with the intermediate case 12 is regulated.

For that reason, the pinion gear 43 revolves around the rotation axis X while auto-rotating around the axis line X1. By doing this, the carrier 45 (side plates 451, 452) that supports the pinion gear 43 rotates around the rotation axis X at a rotation speed lower than the output rotation of the motor 2.

As described above, the linking part 453 of the carrier 45 is linked to the linking part 511 of the sun gear 51 of the second planetary reduction gear 5 side, and the rotation of the carrier 45 (output rotation of the first planetary reduction gear 4) is inputted to the sun gear 51 of the second planetary reduction gear 5.

The output unit (carrier 45) of the first planetary reduction gear 4 is linked with the input unit (sun gear 51) of the second planetary reduction gear 5 without having another member such as a clutch, a shifting mechanism, etc., interposed.

Specifically, the output unit (carrier 45) of the first planetary reduction gear 4, and the input unit (sun gear 51) of the second planetary reduction gear 5 rotate integrally (normally rotate integrally).

Thus, it is possible to make the distance between the first planetary reduction gear 4 and the second planetary reduction gear 5 closer by the amount that the other member is not on the power transmission route, so this contributes to shortening in the axial direction.

With the second planetary reduction gear 5, the sun gear 51 serves as the input unit of the output rotation of the second planetary reduction gear 5, and the carrier 55 that supports the stepped pinion gear 53 serves as the output unit of the inputted rotation.

When the sun gear 51 rotates around the rotation axis X by the inputted rotation, the stepped pinion gear 53 (large diameter gear part 531, small diameter gear part 532) rotates around the axis line X2 by the rotation inputted from the sun gear 51 side.

Here, the small diameter gear part 532 of the stepped pinion gear 53 is engaged with the ring gear 52 fixed to the inner circumference of the case 13. For that reason, the stepped pinion gear 53 revolves around the rotation axis X while auto-rotating around the axis line X2.

By doing this, the carrier 55 (side plates 551, 651) that supports the stepped pinion gear 53 rotates around the rotation axis X at a rotation speed lower than the rotation inputted from the first planetary reduction gear 4 side.

Here, with the stepped pinion gear 53, the outer diameter R2 of the small diameter gear part 532 is smaller than the outer diameter R1 of the large diameter gear part 531 (see FIG. 2).

For that reason, the rotation inputted to the sun gear 51 of the second planetary reduction gear 5 is more greatly reduced by the stepped pinion gear 53 than with the first planetary reduction gear 4, after which it is outputted to the differential case 60 (differential device 6) with which the side plate 651 of the carrier 55 is integrally formed.

Then, the rotation inputted to the differential case 60 is transmitted via the drive shafts 8 (8A, 8B) to the left and right drive wheels (not illustrated) of the vehicle in which the power transmission device 1 is mounted.

In this way, the first planetary reduction gear 4 and the second planetary reduction gear 5 that constitute the reduction mechanism 3 are arranged in series on the transmission route of the output rotation of the motor 2, and one pinion gear of the second planetary reduction gear 5 is used as the stepped pinion gear 53.

This makes it possible to make the reduction ratio greater in the reduction mechanism 3 than when planetary reduction gears having a normal pinion gear (stepless pinion gear) are simply arranged in series in the 1-axis type power transmission device.

[Parking Lock Mechanism 7]

The parking lock mechanism 7 is explained.

FIG. 4 is a drawing for explaining the parking lock mechanism 7. (a) is a drawing schematically showing the A-A cross section of FIG. 3. (b) is a drawing schematically shown the A-A cross section of (a). For convenience of explanation, only a portion of the side plate 451 is noted.

The parking lock mechanism 7 is housed in the recess 129 of the intermediate case 12 noted above.

As shown in FIGS. 4 (a), (b), the parking lock mechanism 7 comprises the parking gear 71 formed on the side plate 451 of the carrier 45, the parking pawl 70, a parking rod 72, a support actuator 75, and a cam 76.

The parking pawl 70 has a plate shaped base 701. The base 701 is supported by a support pin 702 at substantially the center in the longitudinal direction.

The support pin 702 is fixed to the intermediate cover 14 facing along an axis line X3 parallel to the rotation axis X. The parking pawl 70 is supported to be able to rotate around the axis line X3 on the intermediate cover 14 by the support pin 702.

In this state, the parking pawl 70 overlaps the first planetary reduction gear 4 and the second planetary reduction gear 5 in the rotation axis X direction (see FIG. 1).

When viewing from the rotation axis X direction, the base 701 of the parking pawl 70 is provided crossing the axis line X3 (lateral direction in FIG. 4 (a)). The base 701 has an engaging part 70a that engages and disengages with respect to the tooth groove part 71a of the parking gear 71. Furthermore, the base 701 has an operated part 70b that is operated by the cam 76 of the parking rod 72 at the other side sandwiching the axis line X3.

The engaging part 70a engages and disengages with the tooth groove part 71a of the parking gear 71 displaced in the circumferential direction around the axis line X3 when the parking pawl 70 rotates around the axis line X3 (see the virtual line in the drawing). When the engaging part 70*a* engages with the tooth groove part 71; the rotation of the parking gear 71 (carrier 45) is regulated. When the engaging part 70*a* is disengaged from the tooth groove part 71*a*, the rotation of the parking gear 71 (carrier 45) is allowed.

A spring (not illustrated) is attached to the base 701. With the parking pawl 70, the energizing force of the spring acts in the direction of the engaging part 70*a* disengaging from the tooth groove part 71*a* (clockwise direction on the axis line X3).

With the parking pawl 70, when the parking lock mechanism 7 is not operating (when the vehicle is traveling), the energizing force of the spring holds the engaging part 70*a* in a position disengaged from the tooth groove part 71*a*. In this state, the operated part 70*b* abuts the support actuator 75 (see FIG. 4 (*a*)).

As shown in FIG. 4 (*a*), the support actuator 75 is provided above the support pin 702 of the parking pawl 70 in the vertical line VL direction with the state of the power transmission device 1 installed as the reference. The support actuator 75 is fixed to the intermediate cover 14.

The support actuator 75 has a cam surface 751 having an arc shape when viewed from the axis line X3 direction at the part facing the parking pawl 70 (operated part 70*b*).

The cam surface 751 is an inclined plane that is inclined in the direction in which the parking pawl 70 nears the operated part 70*b* as it faces the tip end side of the parking rod 72 (see FIG. 4 (*b*)).

As shown in FIG. 4 (*b*), the parking rod 72 is provided to be able to move forward and backward in an axis line X4 direction parallel to the axis line X3. The forward and backward movement of the parking rod 72 is controlled using a hydraulic circuit of a valve body (not illustrated).

A stopper 74 is fixed to the tip of the parking rod 72 in the axis line X4 direction.

On the stopper 74, the cam 76 energized by a spring Sp abuts from the axis line X3 direction.

The parking rod 72 is held in a position for which the cam 76 is inserted between the cam surface 751 of the support actuator 75 and the operated part 70*b* during operation of the parking lock mechanism 7 (when the vehicle is parked).

The parking rod 72 is held in a position for which the cam 76 is separated from between the cam surface 751 of the actuator 75 and the operated part 70*b* when the parking lock mechanism 7 is not operating.

With the parking lock mechanism 7, when the cam 76 is inserted between the cam surface 751 of the support actuator 75 and the operated part 70*b*, the parking pawl 70 pressed by the cam 76 rotates counterclockwise on the axis line X3 in resistance to the energizing force of the spring.

When the engaging part 70*a* of the parking pawl 70 is engaged with the tooth groove part 71*a* of the outer circumference of the parking gear 71, the rotation of the carrier 45 is regulated (see virtual line in FIG. 4 (*a*)).

Here, when the parking lock mechanism 7 is operating (when the vehicle is parked), torque is input to the parking lock mechanism 7 from the drive wheel side (drive shafts 8, differential device 6).

With the present embodiment, the second planetary reduction gear 5 is interposed between the parking lock mechanism 7 and the drive wheel in the transmission route of the output rotation of the motor 2. As a result, when the parking lock mechanism 7 is operating (when the vehicle is parked), the torque input from the parking lock mechanism 7 from the drive wheel side is reduced (made smaller).

As described above, the power transmission device 1 of the present embodiment has the following configuration.

(1) This has: the first planetary reduction gear 4 (planetary gear), the second planetary reduction gear 5 (reduction gear) connected downstream of the first planetary reduction gear 4, and the parking lock mechanism 7.

The parking lock mechanism 7 locks the carrier 45 (one rotation element) of the first planetary reduction gear 4.

By configuring in this way, torque is input to the parking lock mechanism 7 from the output side (drive wheel side) with the second planetary reduction gear 5 interposed, so the torque applied to the parking lock mechanism 7 is reduced.

The power transmission device 1 of the present embodiment has the following configuration.

(2) The parking pawl 70 of the parking lock mechanism 7, the first planetary reduction gear 4, and the second planetary reduction gear 5 overlap in the rotation axis X direction.

By configuring in this way, the size of the power transmission device 1 is contracted in the radial direction of the rotation axis X.

The power transmission device 1 of the present embodiment has the following configuration.

(3) This has the intermediate cover 14 (barrier wall) between the first planetary reduction gear 4 and the second planetary reduction gear 5, and the parking pawl 70 is supported to be able to rotate on the intermediate cover 14.

In this way, by configuring going so far as to have a barrier wall provided inside the gear chamber, it is possible to make support of the parking pawl 70 easier.

The power transmission device 1 of the present embodiment has the following configuration.

(4) The parking lock mechanism 7 locks the outer circumference side of the carrier 45 of the first planetary reduction gear 4.

By configuring in this way, it is possible to suppress an increase in size by using space of the side surface of the ring gear 42 and the outer diameter side of the carrier 45.

The power transmission device 1 of the present embodiment has the following configuration.

(5) The first planetary reduction gear 4 is connected downstream of the motor 2.

The motor 2 and the first planetary reduction gear 4 overlap in the rotation axis X direction.

By configuring in this way, it is possible to shrink the overall size of the power transmission device 1 in the radial direction of the rotation axis X.

MODIFICATION EXAMPLE

Figure 5:
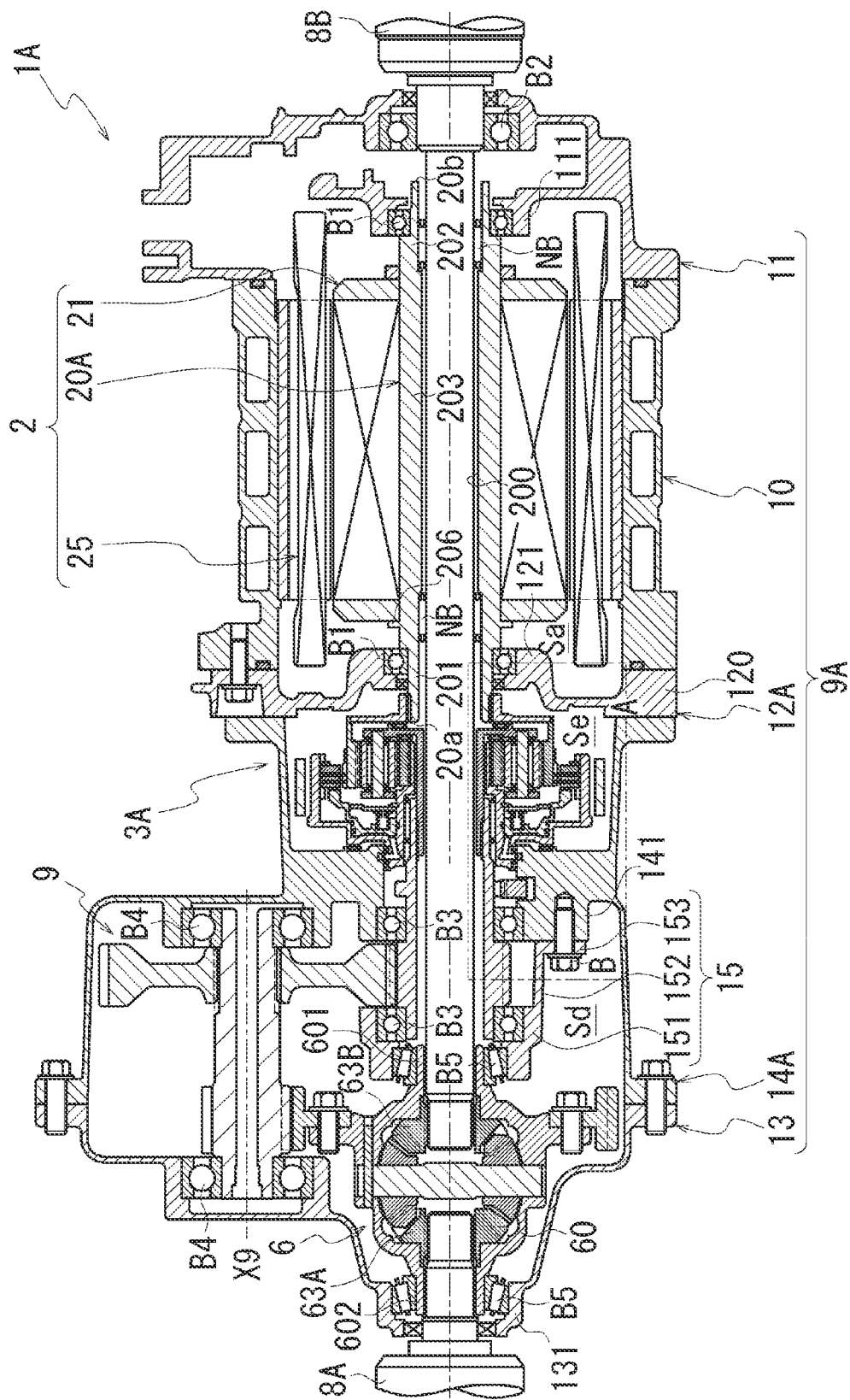
FIG. 5 is a drawing for explaining the power transmission device of a modification example.

FIG. 5 is a drawing for explaining a power transmission device 1A of a modification example.

Figure 6:
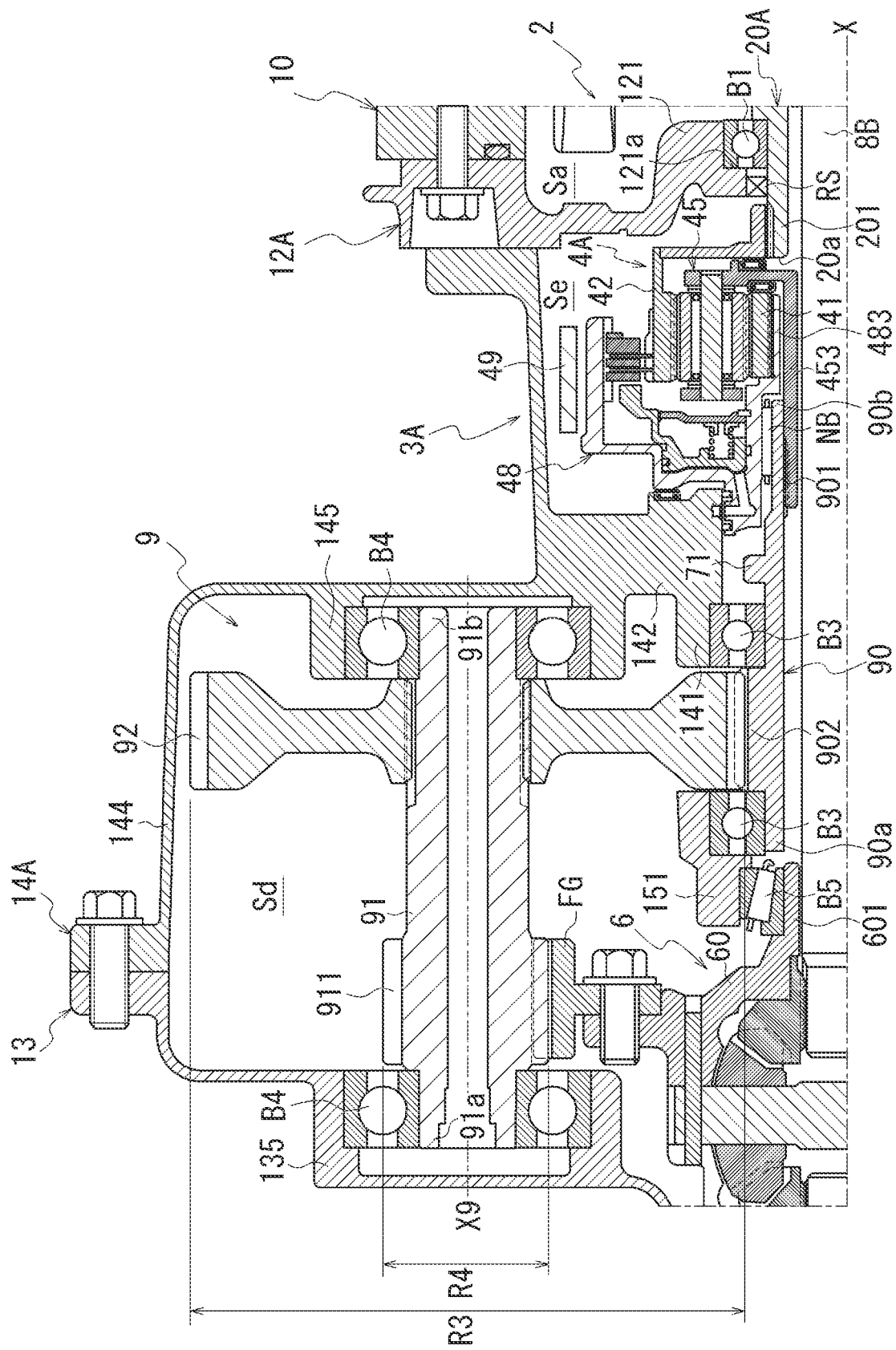
FIG. 6 is a drawing for explaining the power transmission device of a modification example.

FIG. 6 is a drawing for explaining the power transmission device 1A of the modification example, and is an enlarged view around a transmission mechanism 3A and the counter gear 9 of the power transmission device 1A.

Figure 7:
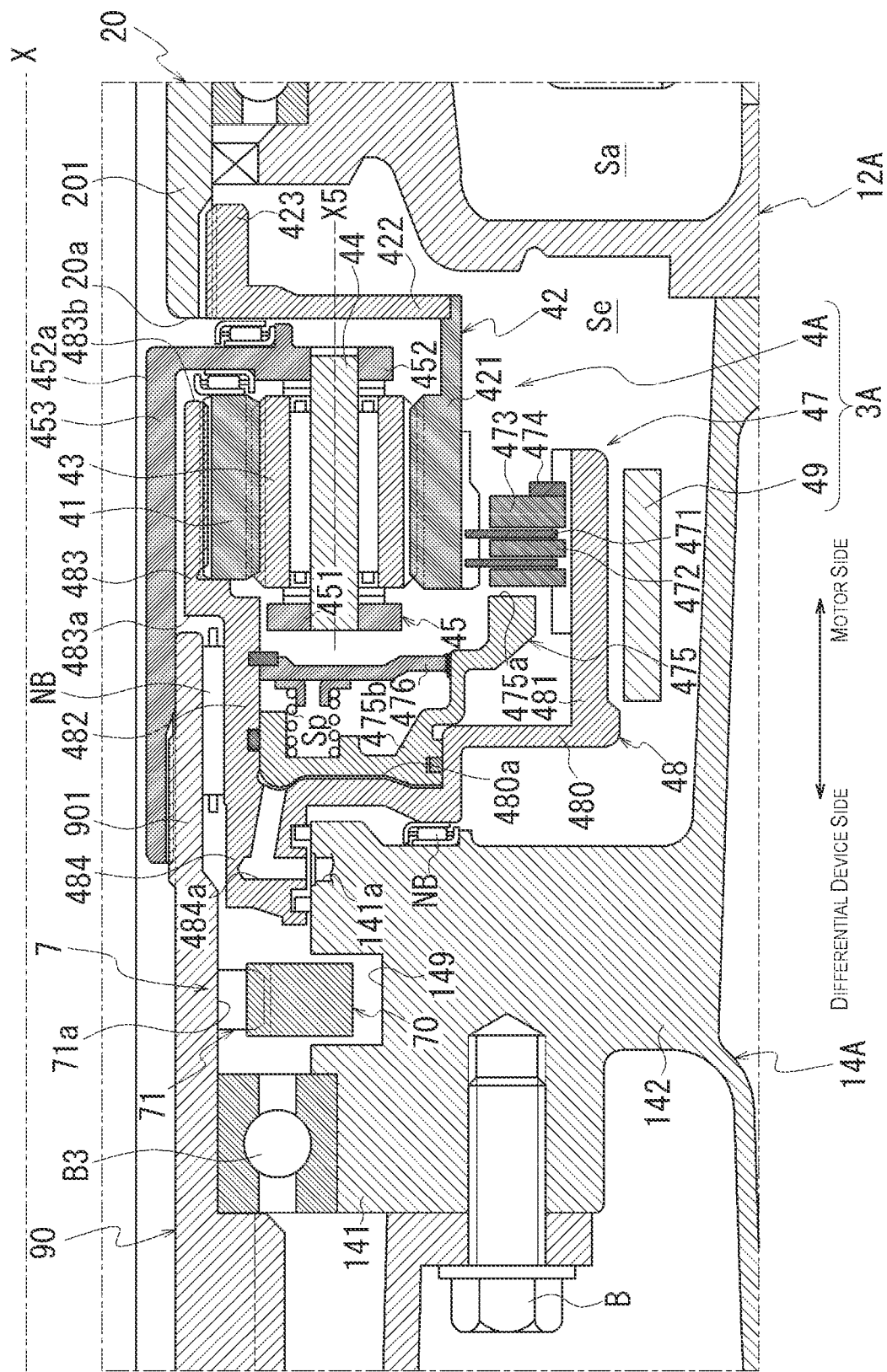
FIG. 7 is a drawing for explaining the power transmission device of a modification example.

FIG. 7 is a drawing for explaining the power transmission device 1A of the modification example, and is an enlarged view of region A in FIG. 5.

With the explanation hereafter, an explanation is omitted for parts in common with the power transmission device 1 of the present embodiment.

With the embodiment described above, an example was shown of a case with the first planetary reduction gear 4 and the second planetary reduction gear 5 arranged on the transmission route of the output rotation of the motor 2.

The present invention is not limited to only this mode. For example as shown in FIG. 5, instead of the first planetary reduction gear 4 and the second planetary reduction gear 5, it is also possible to configure with the transmission mechanism 3A and the counter gear 9 provided on the transmission route of the output rotation of the motor 2.

As shown in FIG. 5, the power transmission device 1A has the motor 2, the transmission mechanism 3A, the counter gear 9 that transmits the output rotation of the transmission mechanism 3A to the differential device 6, and the differential device 6 that transmits the transmitted rotation to drive shafts 8 (8A, 8B).

With the power transmission device 1A, the transmission mechanism 3A, the counter gear 9, the differential device 6, and the drive shafts 8 (8A, 8B) are provided along the transmission route of the output rotation of the motor 2.

After being shifted by the transmission mechanism 3A, the output rotation of the motor 2 is reduced by the counter gear 9, and transmitted to the differential device 6. With the differential device 6, the transmitted rotation is transmitted via the drive shafts 8 (8A, 8B) to drive wheels (not illustrated) at left and right of a vehicle in which the power transmission device 1A is mounted.

Here, the transmission mechanism 3A is connected downstream of the motor 2, the counter gear 9 is connected downstream of the transmission mechanism 3A, the differential device 6 is connected downstream of the counter gear 9, and the drive shafts 8 (8A, 8B) are connected downstream of the differential device 6.

With the power transmission device 1A of the modification example, the body case 9A of the power transmission device 1A is constituted by the motor housing 10, the outer cover 11, the intermediate case 12A, the outer case 13, and the intermediate cover 14A.

Also, the case (first case member) of the motor 2 is constituted by the motor housing 10, the outer cover 11, and the intermediate case 12A.

The case (second case member) that houses the counter gear 9 and the differential device 6 is constituted by the outer case 13 and the intermediate cover 14A.

Here, a space Sa formed between the outer cover 11 and the intermediate case 12A on the inner diameter side of the motor housing 10 serves as the motor chamber that houses the motor 2.

As shown in FIG. 6, the space formed between the outer case 13 and the intermediate cover 14A is partitioned into a space Sd that houses the counter gear 9 and the differential device 6, and a space Se that houses the transmission mechanism 3A, by a partition wall 142 provided in the intermediate cover 14A.

Thus, the space Sd serves as a first gear chamber that houses the counter gear 9 and the differential device 6, and the space Se serves as a second gear chamber that houses the transmission mechanism 3A.

As shown in FIG. 5, the motor shaft 20A is a cylindrical member that has an insertion hole 200 for the drive shaft 8B, and the motor shaft 20A is externally fitted on the drive shaft 8B.

With the insertion hole 200 of the motor shaft 20A, a linking part 201 of the one end 20a side in the longitudinal direction, and a supported part 202 of the other end 20b side are formed with an inner diameter that is larger than an intermediate area 203 between the linking part 201 and the supported part 202 in the rotation axis X direction.

The inner circumference of the linking part 201 and the inner circumference of the supported part 202 are supported by needle bearings NB, NB that are externally fitted on the drive shaft 8B.

In this state, the motor shaft 20A is provided to be able to rotate relatively with respect to the drive shaft 8B.

With the motor shaft 20A, bearings B1, B1 are externally fitted and fixed to the outer circumference of the one end 20a side and the other end 20b side in the longitudinal direction.

The one end 20a side of the motor shaft 20A is supported to be able to rotate by a cylindrical motor support unit 121 of an intermediate case 12A with the bearing B1 interposed.

The other end 20b side of the motor shaft 20A is supported to be able to rotate by a cylindrical motor support unit 111 of the cover 11 with the bearing B1 interposed.

As shown in FIG. 6, with the one end 20a of the motor shaft 20A, the motor support unit 121 of the intermediate case 12A is positioned inside the space Se penetrating the transmission mechanism 3A side (left side in the drawing).

The lip seal RS is arranged on the inner circumference of the motor support unit 121.

The lip seal RS seals the gap between the inner circumference of the motor support unit 121 and the outer circumference of the motor shaft 20A.

The lip seal RS partitions the space Sa of the inner diameter side of the motor housing 10, and the space Se of the inner diameter side of the intermediate cover 14A, and is provided to block entry of oil OL to inside the space Sa from the space Se side.

As shown in FIG. 7, the transmission mechanism 3A housed inside the space Se has a planetary reduction gear 4A, a clutch 47, and a band brake 49.

The planetary reduction gear 4A has the sun gear 41, the ring gear 42, the pinion gear 43, the pinion shaft 44, and the carrier 45.

The constitutional elements of the planetary reduction gear 4A (sun gear 41, ring gear 42, pinion gear 43, pinion shaft 44, carrier 45) are provided on the inner diameter side of an outer wall part 481 of a clutch drum 48.

The clutch 47 has: a drive plate 471 (inner diameter side friction plate) spline fitted to the outer circumference of the ring gear 42; a driven plate 472 (outer diameter side friction plate) spline fitted to the inner circumference of the outer wall part 481 of the clutch drum 48; and a piston 475 provided to be able to move in the rotation axis X direction.

The clutch drum 48 has the outer wall part 481, a disk part 480, an inner wall part 482, and a linking part 483.

The outer wall part 481 has a cylindrical shape that surrounds the rotation axis X with a prescribed gap. The disk part 480 extends to the inner diameter side from the end part of the differential device 6 side (right side in the drawing) of the outer wall part 481. The area of the inner diameter side of the disk part 480 is a recess 480a recessed in the direction away from the planetary reduction gear 4A.

The inner wall part 482 is formed in a cylinder shape that surrounds the rotation axis X with a prescribed gap. The inner wall part 482 extends to the planetary reduction gear 4A side (right side in the drawing) from the end part of the inner diameter side of the disk part 480, and the tip of the inner wall part 482 faces the meshing portion of the sun gear 41 and the pinion gear 43 with a gap open in the rotation axis X direction.

The linking part 483 has a cylindrical shape that surrounds the rotation axis X with a prescribed gap. With the linking part 483, a base end part 483a in the longitudinal direction is linked to the inner circumference of the tip side of the inner wall part 482.

The linking part 483 extends in a straight line in the direction approaching the motor 2 (rightward in the drawing) on the extension of the linking part 201 of the motor shaft 20 noted above. A tip 483b of the linking part 483 is positioned further to the motor 2 side than the outer wall part 481.

The clutch drum 48 consisting of the outer wall part 481, the disk part 480, the inner wall part 482, and the linking part 483 has an opening provided facing the motor 2 side, and the sun gear 41 of the planetary reduction gear 4A is spline fitted to the outer circumference of the linking part 483 positioned on the inner diameter side.

With the planetary reduction gear 4A, the ring gear 42 is positioned at the outer diameter side of the sun gear 41. The ring gear 42 has: a peripheral wall part 421 that surrounds the outer circumference of the sun gear 41 with a prescribed gap; a disk part 422 that extends to the inner diameter side from the end part of the motor 2 side of the peripheral wall part 421; and a linking part 423 that extends to the motor 2 side from the end part of the inner diameter side of the disk part 422.

The linking part 423 has a ring shape that surrounds the rotation axis X with a prescribed gap, and the linking part 201 of the one end 20a side of the motor shaft 20 is spline fitted to the inner circumference of the linking part 423.

With the peripheral wall part 421 positioned further to the outer diameter side than the linking part 423, the outer circumference of the pinion gear 43 engages with the inner circumference of the area positioned at the outer diameter side of the sun gear 41.

The pinion gear 43 engages with the inner circumference of the peripheral wall part 421 of the ring gear 42 side, and the outer circumference of the sun gear 41.

The pinion shaft 44 that supports the pinion gear 43 is provided facing along axis line X5 that is parallel to the rotation axis X. One end and the other end of the pinion shaft 44 are supported by a pair of side plates 451, 452 that constitute the carrier 45.

The side plates 451, 452 are provided in parallel to each other with a gap open in the axis line X5 direction.

One side plate 452 positioned at the motor 2 side extends more to the rotationally inward side of the rotation axis X than the other side plate 451. The cylindrical linking part 453 that surrounds the rotation axis X with a prescribed gap is integrally formed with an end part 452a of the inner diameter side of the side plate 452.

The linking part 453 extends on the rotation axis X side (inner diameter side) of the linking part 201 of the motor shaft 20 in the direction away from the motor 2 along the rotation axis X.

The linking part 453 is provided crossing the inner diameter side of the sun gear 41 from the motor 2 side to the differential device 6 side (left side in the drawing), and the linking part 453 is spline fitted to the inner circumference of a linking part 901 of a hollow shaft 90 at the inner diameter side of the inner wall part 482 of the clutch drum 48.

The driven plate 472 of the clutch 47 is spline fitted to the inner circumference of the outer wall part 481 of the clutch drum 48. The drive plate 471 of the clutch 47 is spline fitted to the outer circumference of the peripheral wall part 421 of the ring gear 42.

The drive plate 471 and the driven plate 472 are provided alternately between the peripheral wall part 421 of the ring gear 42 and the outer wall part 481 of the clutch drum 48.

A retaining plate 473 positioned by a snap ring 474 is positioned at the motor 2 side of the area in which the drive plate 471 and the driven plate 472 are alternately provided, and a pressing unit 475a of the piston 475 is positioned at the differential device 6 side.

A base 475b of the inner diameter side of the piston 475 is provided at a position farther from the planetary reduction gear 4A than the pressing unit 475a on the outer diameter side. The base 475b of the inner diameter side of the piston 475 is internally fitted in the recess 480a of the inner diameter side of the disk part 480 adjacent in the rotation axis X direction.

The spring Sp supported by a spring retainer 476 is pressure welded from the rotation axis X direction on the surface of the motor 2 side (left side in the drawing) of the base 475b.

The piston 475 is energized to the differential device 6 side by the energizing force acting from the spring Sp.

With the clutch drum 48, at the boundary of the recess 480a and the inner wall part 482, a projection 484 that projects to the differential device 6 side is provided. The projection 484 is inserted in the inner circumference of a first support unit 141 of a bearing B3. The first support unit 141 is provided at the inner diameter side of the partition wall 142. A supply channel 141a of the oil OL is opened in the inner circumference of the first support unit 141.

In the interior of the projection 484, provided is an oil passage 484a for guiding the oil OL supplied from the first support unit 141 side to inside the recess 480a of the clutch drum 48.

The oil OL supplied via the oil passage 484a is supplied to an oil chamber between the base 475b of the piston 475 and the recess 480a, and displaces the piston 475 to the motor 2 side.

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by an actuator (not illustrated), the rotation of the clutch drum 48 around the rotation axis X is regulated.

With the transmission mechanism 3A, the planetary reduction gear 4A and the clutch 47 are positioned at the inner diameter side of the band brake 49. The band brake 49, the planetary reduction gear 4A, and the clutch 47 overlap in the radial direction of the rotation axis X, and when viewed from radially outward of the rotation axis X, the band brake 49, the planetary reduction gear 4A, and the clutch 47 are provided in an overlapping positional relationship.

With the transmission mechanism 3A, the ring gear 42 of the planetary reduction gear 4A serves as the input unit of the outputted rotation of the motor 2, and the carrier 45 as the output unit of the inputted rotation.

In specific terms, after being shifted by the transmission mechanism 3A, the output rotation of the motor 2 is outputted to the hollow shaft 90 to which the linking part 453 of the carrier 45 is linked.

As shown in FIG. 6, with the hollow shaft 90 to which rotation shifted by the transmission mechanism 3A is inputted, one end 90a in the longitudinal direction is provided with a gap open in the rotation axis X direction on a bearing B5 that supports the support unit 601 of the differential case 60. An other end 90b of the hollow shaft 90 serves as the linking part 901 with the planetary reduction gear 4A.

The outer circumference of the linking part 901 is supported by the needle bearing NB interposed between itself and the inner wall part 482 of the clutch drum 48. The parking gear 71 is provided between a region in the linking part 901 supported by the needle bearing NB, and a region supported by the bearing B3 described later.

Here, as shown in FIG. 7, a recess 149 positioned facing the parking gear 71 is formed on the first support unit 141 of the intermediate cover 14A. The recess 149 is formed below the rotation axis X in the vertical line VL direction in the state with the power transmission device 1A installed.

The parking lock mechanism 7 is housed inside the recess 149.

With the parking lock mechanism 7 of the power transmission device 1A, the parking pawl 70 is supported to be able to rotate around the abovementioned axis line X3 by the abovementioned support pin 702 (see FIG. 4).

In this case, the support pin 702 may also be provided in either the side wall of the motor 2 side in the recess 149 or the side wall of the differential device 6 side.

The parking lock mechanism 7 of the power transmission device 1A of the modification example has the same configuration as the present embodiment, so a specific explanation is omitted.

With the parking lock mechanism 7 of the power transmission device 1A, when the engaging part 70a of the parking pawl 70 engages with the tooth groove part 71a of the outer circumference of the parking gear 71, the rotation of the linking part 901 (hollow shaft 90) is regulated. As a result, the rotation of the linking part 453 (carrier 45) spline fitted to the inner circumference of the linking part 901 is regulated. In other words, the parking lock mechanism 7 locks the carrier 45 which is one rotation element of the planetary reduction gear 4A.

As shown in FIG. 6, a gear part 902 is formed integrally at the outer circumference of the one end 90a side of the hollow shaft 90. Bearings B3, B3 are externally fitted on both sides of the gear part 902.

The bearing B3 of the one end 90a side is supported by a support unit 151 of the outer case 13 side, and the bearing B3 of the other end 90b side is supported by the first support unit 141 of the intermediate cover 14A.

A large diameter gear 92 of the counter gear 9 is engaged capable of rotation transmission to the outer circumference of the gear part 902. In the counter gear 9, the large diameter gear 92 is spline fitted to the outer circumference of a cylindrical hollow shaft part 91.

At a one end part 91a and another end part 91b in the longitudinal direction of the hollow shaft part 91, bearings B4, B4 are externally fitted. The bearing B4 externally fitted to the one end part 91a of the hollow shaft part 91 is inserted in a cylindrical second support unit 135 of the outer case 13. The one end part 91a of the hollow shaft part 91 is supported to be able to rotate by the second support unit 135 of the outer case 13 via the bearing B4.

The bearing B4 that is externally fitted in the other end part 91b of the hollow shaft part 91 is inserted in a cylindrical second support unit 145 of the intermediate cover 14A. The other end part 91b of the hollow shaft part 91 is supported to be able to rotate on the second support unit 145 of the intermediate cover 14A via the bearing B4.

In this state, the hollow shaft part 91 of the counter gear 9 is provided along a rotation axis X9 parallel to the rotation axis X.

With the hollow shaft part 91, a small diameter gear part 911 is provided at the one end part 91a side (left side in the drawing). The small diameter gear part 911 is integrally formed with the hollow shaft part 91, and is formed with an outer diameter R4 that is smaller than an outer diameter R3 of the large diameter gear 92.

The small diameter gear part 911 is engaged to be able to do rotation transmission with a final gear FG fixed to the differential case 60 of the differential device 6.

With the power transmission device 1A, the output rotation of the motor 2 is inputted to the counter gear 9 via the transmission mechanism 3A and the hollow shaft 90, and via the large diameter gear 92 engaged with the gear part 902 of the hollow shaft 90.

With the counter gear 9, the large diameter gear 92 is spline fitted to the outer circumference of the hollow shaft part 91, and the small diameter gear part 911 is integrally formed with the hollow shaft part 91.

For that reason, when the output rotation of the motor 2 is inputted to the counter gear 9, the small diameter gear part 911 rotates around the axis line X9 together with the large diameter gear 92.

Having done that, the final gear FG with which the small diameter gear part 911 engages to be able to transmit rotation is fixed to the differential case 60, so the differential case 60 rotates around the rotation axis X in conjunction with the rotation of the counter gear 9 around the axis line X9.

Here, with the counter gear 9, the outer diameter R4 of the small diameter gear part 911 is smaller than the outer diameter R3 of the large diameter gear part 92 (see FIG. 6).

Also, with the counter gear 9, the large diameter gear 92 serves as the input unit of the rotation transmitted from the motor 2 side, and the small diameter gear part 911 serves as the output unit of the transmitted rotation.

Having done that, the rotation inputted to the counter gear 9, after being significantly reduced, is outputted to the differential case 60.

As shown in FIG. 6, the bearing B5 is externally fitted on the support unit 601 of the differential case 60.

The support unit 601 of the differential case 60 is supported to be able to rotate on the support unit 151 of a support member 15 fixed to the outer case 13 via the bearing B5.

The bearing B5 that is externally fitted on the support unit 601 is held by the ring shaped support unit 151 of the support member 15.

As shown in FIG. 5, the support member 15 has a cylindrical part 152 extending to the motor 2 side (right side in the drawing) from the outer circumference of the support unit 151, and a flange part 153 that surrounds the opening of the tip side of the cylindrical part 152 across the entire circumference. The flange part 153 of the support member 15 is fixed to the first support unit 141 of the intermediate cover 14A by a bolt B that penetrates the flange part 153.

The support unit 601 of the differential case 60 is supported to be able to rotate by the support member 15 via the bearing B5. With the present embodiment, the support member 15 is fixed to the intermediate case 14A. For that reason, the support unit 601 of the differential case 60 is supported by the intermediate case 14A which is a fixed side member with the bearing B5 and the support member 15 interposed.

As shown in FIG. 5, the drive shaft 8B that penetrates the opening 114 of the outer cover 11 is inserted in the support unit 601 of the differential case 60 from the rotation axis X direction.

The drive shaft 8B is provided crossing the motor shaft 20A of the motor 2, the planetary reduction gear 4A, and the inner diameter side of the hollow shaft 90 in the rotation axis X direction, and the tip side of the drive shaft 8B is supported to be able to rotate by the support unit 601.

In the interior of the differential case 60, the side gears 63A, 63B are spline fitted at the outer circumference of the tip part of the drive shafts 8 (8A, 8B), and the side gears 63A, 63B and the drive shafts 8 (8A, 8B) are linked to be able to rotate integrally around the rotation axis X.

When the parking lock mechanism 7 is operating (when the vehicle is parked), torque is input to the parking lock mechanism 7 from the drive wheel side (drive shafts 8, differential device 6).

With the power transmission device 1A, the counter gear 9 is interposed between the parking lock mechanism 7 and the drive wheel in the transmission route of the output rotation of the motor 2. By doing this, when the parking lock mechanism 7 is operating (when the vehicle is parked), the torque input to the parking lock mechanism 7 from the drive wheel side is reduced (made smaller).

As described above, the power transmission device 1A of the modification example has the following configuration.

(6) It has:
the planetary reduction gear 4A (reduction gear),
the counter gear 9 (reduction gear) connected downstream of the planetary reduction gear 4A, and
the parking lock mechanism 7.

The parking lock mechanism 7 locks the carrier 45 (one of the rotation elements) of the planetary reduction gear 4A.

When configured in this way, torque is input to the parking lock mechanism 7 via the counter gear 9 from the output side (drive wheel side), so torque applied to the parking lock mechanism 7 is reduced.

The power transmission device 1A of the modification example has the following configuration.

(7) The planetary reduction gear 4A is connected downstream of the motor 2.

The motor 2 and the planetary reduction gear 4A overlap in the rotation axis X direction.

By configuring in this way, it is possible to shrink the overall size of the power transmission device 1A in the radial direction of the rotation axis X.

Here, the term "connected downstream" in this specification means being in a connection relationship in which the power is transmitted from the components arranged upstream to the components arranged downstream.

For example, in the case of the first planetary reduction gear 4 connected downstream of the motor 2, this means that the power is transmitted from the motor 2 to the first planetary reduction gear 4.

Also, the term "directly connected" in this specification means that the members are connected with the ability to transmit power to each other without the interposition of another member by which the reduction ratio is converted such as a reduction mechanism, an acceleration mechanism, a transmission mechanism, etc.

Above, embodiments of the invention of the present application were explained, but the invention of the present application is not limited to only the modes shown in these embodiments. Changes can be made as appropriate within the scope of the technical concept of the invention.

The invention claimed is:

1. A power transmission device comprising:
a planetary gear;
a reduction gear connected downstream of the planetary gear;
a parking lock mechanism including a parking pawl configured to lock one rotation element of the planetary gear; and
a barrier wall positioned between the planetary gear and the reduction gear, wherein
the parking pawl is rotatably supported on the barrier wall.

2. The power transmission device according to claim 1, wherein
the parking pawl, the planetary gear, and the reduction gear overlap in an axial direction.

3. The power transmission device according to claim 1, wherein
the parking lock mechanism locks an outer circumference side of a carrier of the planetary gear.

4. The power transmission device according to claim 1, wherein
the planetary gear is connected downstream of a motor, and
the motor and the planetary gear overlap in an axial direction.

5. A power transmission device comprising:
a planetary gear;
an intermediate case having a portion of a wall defining a space that houses the planetary gear;
a casing linked with the intermediate case;
a parking gear configured to rotate integrally with one rotation element of the planetary gear;
a parking pawl configured to engage with and disengage from the parking gear; and
a barrier wall positioned between the parking pawl and the casing, and rotatably supporting the parking pawl.

6. The power transmission device according to claim 5, further comprising
a motor arranged downstream of the planetary gear, the motor overlapping the planetary gear in an axial direction.

7. The power transmission device according to claim 5, wherein the parking pawl is positioned at an inner circumference of the intermediate case.

8. The power transmission device according to claim 5, further comprising a gear arranged downstream of the planetary gear.

9. The power transmission device according to claim 5, wherein the parking pawl overlaps the planetary gear in an axial direction.

10. The power transmission device according to claim 5, wherein the parking pawl overlaps the barrier wall in an axial direction.

11. The power transmission device according to claim 5, further comprising:
a first bearing supported on the barrier wall;
a second bearing supported on the casing; and
a third bearing supported on the intermediate case.

* * * * *